United States Patent
Zamel et al.

(10) Patent No.: US 6,968,112 B2
(45) Date of Patent: Nov. 22, 2005

(54) COMPACT PACKAGING OF MULTIPLE FIBER LASERS

(75) Inventors: James M. Zamel, St. Charles, MO (US); Hiroshi Komine, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 190 days.

(21) Appl. No.: 10/391,323

(22) Filed: Mar. 18, 2003

(65) Prior Publication Data

US 2004/0182732 A1 Sep. 23, 2004

(51) Int. Cl.[7] .............................. G02B 6/00; B65H 75/20
(52) U.S. Cl. ...................... 385/136; 385/134; 385/137; 385/147; 242/118.4; 242/570
(58) Field of Search .................. 385/134, 135, 385/136, 137, 147; 242/118.4, 118.41, 570

(56) References Cited

U.S. PATENT DOCUMENTS

| | | | |
|---|---|---|---|
| 4,696,438 A | * | 9/1987 | Myers .................. 242/118.41 |
| 5,193,761 A | * | 3/1993 | Fritz et al. .................. 242/159 |
| 6,259,849 B1 | * | 7/2001 | McLean et al. ............. 385/134 |
| 2002/0179760 A1 | * | 12/2002 | Gregory .................. 242/118.4 |

* cited by examiner

Primary Examiner—Brian M. Healy

(57) ABSTRACT

A compact fiber packaging system for fiber lasers is provided that comprises a series of spools nested inside one another for efficient volume utilization. The spools comprise an inner spool nested inside at least one outer spool to form a module. Generally, the fiber lasers are wrapped around the inner spool, and then around successive outer spools as required to form the module. Furthermore, the modules may be stacked to form a fiber assembly. The compact fiber packaging system further comprises devices and methods for minimizing thermal gradients between fibers and for removing Waste heat from the system. Additionally, the available volume is further utilized by disposing equipment and materials for operation of the fibers inside a hollow center defined by the inner spool, between the nested spools, and adjacent the nested spools.

31 Claims, 3 Drawing Sheets

COMPACT PACKAGING OF MULTIPLE FIBER LASERS

BACKGROUND OF THE INVENTION

The present invention relates generally to the packaging of fibers, and more particularly to compact packaging of high power fiber lasers that further require controlled thermal gradients and removal of waste heat.

Fiber lasers of the known art are generally packaged by wrapping the fiber lasers around individual spools. The individual spools are commonly the same size and are placed side by side, or adjacent one another for packaging. Further, the spools are generally circular in shape and are limited in size by the minimum bend radius of the fiber lasers. Unfortunately, the individually wrapped spools of the known art cannot be used in systems that require a large number of fibers in a limited amount of space due to the excessive amount of volume consumed by the spools. Additionally, the volume inside the spool often goes unused, which further reduces the volume efficiency of the spools.

Laser systems comprising hundreds to thousands of fibers are currently being designed for applications requiring extremely limited volume consumption. For example, laser systems for weapons applications in military aircraft must be capable of being packaged within avionics or weapons bays, which are further limited by the size of access doors. Further, laser systems are being developed for telecommunications applications, which also pose similar volume restrictions. Accordingly, the volume consumed by the individual spools must be minimized in order to meet the requirements of newer laser systems.

In addition to limited volume requirements, high power laser systems further require control of temperature and thermal gradients within the fibers to minimize laser power losses. High power fiber lasers generate a significant amount of heat that must be removed from the system. In systems of the known art, waste heat is generally removed by a continuous duty cooling system. Unfortunately, the continuous duty cooling systems are relatively large and expensive and run continuously to remove the waste heat from the fiber lasers, although the fiber lasers often only operate intermittently.

Accordingly, there remains a need in the art for a laser fiber packaging system that significantly reduces the amount of volume consumed by the fibers and related equipment, and which is further capable of controlling thermal gradients between the fiber lasers and removing waste heat.

SUMMARY OF THE INVENTION

In one preferred form, the present invention provides a compact fiber packaging system comprising spools in increasing sizes nested around one another, wherein the fibers are wrapped around an inner spool that is nested inside at least one outer spool, and the fibers are further wrapped around the outer spool to form a module. Accordingly, the volume inside the outer spool is efficiently filled with the inner spool and the fibers wrapped around the inner spool, thereby allowing a larger number of fibers to be packaged into a relatively small volume.

The compact fiber packaging system according to the present invention also provides for any number of outer spools that nest around the inner spool to form modules of varying size and power as required. Additionally, the modules may be stacked to form a fiber assembly. Moreover, a variety of fiber types may be wrapped around the spools, including but not limited to, fiber lasers, optical fibers, electrical wires, and others. Accordingly, the application to fiber lasers is merely illustrative of one structure and one operating environment in which the present invention has particular utility, and thus the application to fiber lasers should not be construed as limiting the scope of the present invention.

In addition to efficiently utilizing volume by nesting the spools, the packaging system of the present invention also utilizes the volume inside the inner spool. The inner spool, as with other spools, defines a hollow center that comprises a volume. The volume of the hollow center is accordingly filled with equipment and materials that are required for operation of the fibers. Furthermore, since the shape of the spools is not necessarily round, and is instead primarily limited by the minimum bend radius of the fibers, a wide variety of equipment and materials may be disposed within the hollow center. Moreover, the shape of the hollow center may be designed for a specific set of fiber equipment to more efficiently utilize the available volume.

The equipment and materials that support operation of the fibers may further be integrated with the nested spools on the exterior thereof. In one preferred form, at least one shelf is mounted to the nested spools, wherein the equipment and materials are disposed on the shelf for operation of the fibers. The equipment disposed on the shelf, which may also be disposed within the hollow center of the inner spool, may include, for example, electronics, cooling systems, beam directors, and pump diodes. The equipment may further comprise an optical bench, which transfers output from the fibers to a next point of usage such as a beam director.

The compact fiber packaging system of the present invention further provides devices and methods for dissipating heat generated by the laser fibers in order to minimize power losses. In one form, phase change materials are disposed within the modules, local to, for example, pump diodes to store waste heat that is generated by the laser fibers during operation. The phase change materials absorb waste heat, and then a relatively small, light weight, and less expensive cooling system is employed to remove the waste heat. The phase change materials may be disposed on the shelf or within the hollow center of the inner spool, depending on the location of the heat source(s) and the particular application.

Additional devices and methods are provided to minimize thermal gradients within the fibers to further minimize power losses. In one form, an insulating layer is disposed within the fibers and each spool. Additionally, a thermally conductive potting compound may be disposed between the spools to further minimize thermal gradients. Yet another method of reducing thermal gradients involves using a thermally conductive material in the structure, or mandrels, of the spools. Either one or a plurality of the aforementioned devices and methods may be employed according to the present invention to minimize thermal gradients between the fibers.

In another preferred form, the fiber packaging system comprises at least one inner spool nested inside at least one outer spool, wherein fibers are wrapped around the spools to form a low power stage spool. Additionally, at least one second stage inner spool is nested inside at least one second stage outer spool, wherein the fibers are wrapped around the spools to form high power stage spools. Accordingly, the low power stage spool is nested inside the high power stage spools, thereby forming a power staged module. Similarly, a plurality of power staged modules may be stacked to form a fiber assembly, which may also comprise an optical bench to transfer the fiber laser output to a next point of usage.

In yet another preferred form, the present invention provides a method of assembling fibers into modules and further into fiber assemblies. Generally, the fibers are first wrapped around an inner spool, and the inner spool is then nested inside at least one outer spool. Accordingly, the outer spools further comprise an aperture or slot that accommodates the fibers running from one spool to the next. The fibers are subsequently wrapped around the outer spools, thereby forming a module. A plurality of modules may then be stacked to form a fiber assembly, which may also further comprise an optical bench to transfer the output of the fiber lasers. Furthermore, devices to control waste heat and thermal gradients as previously described are installed on or within the module as required according to the teachings of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
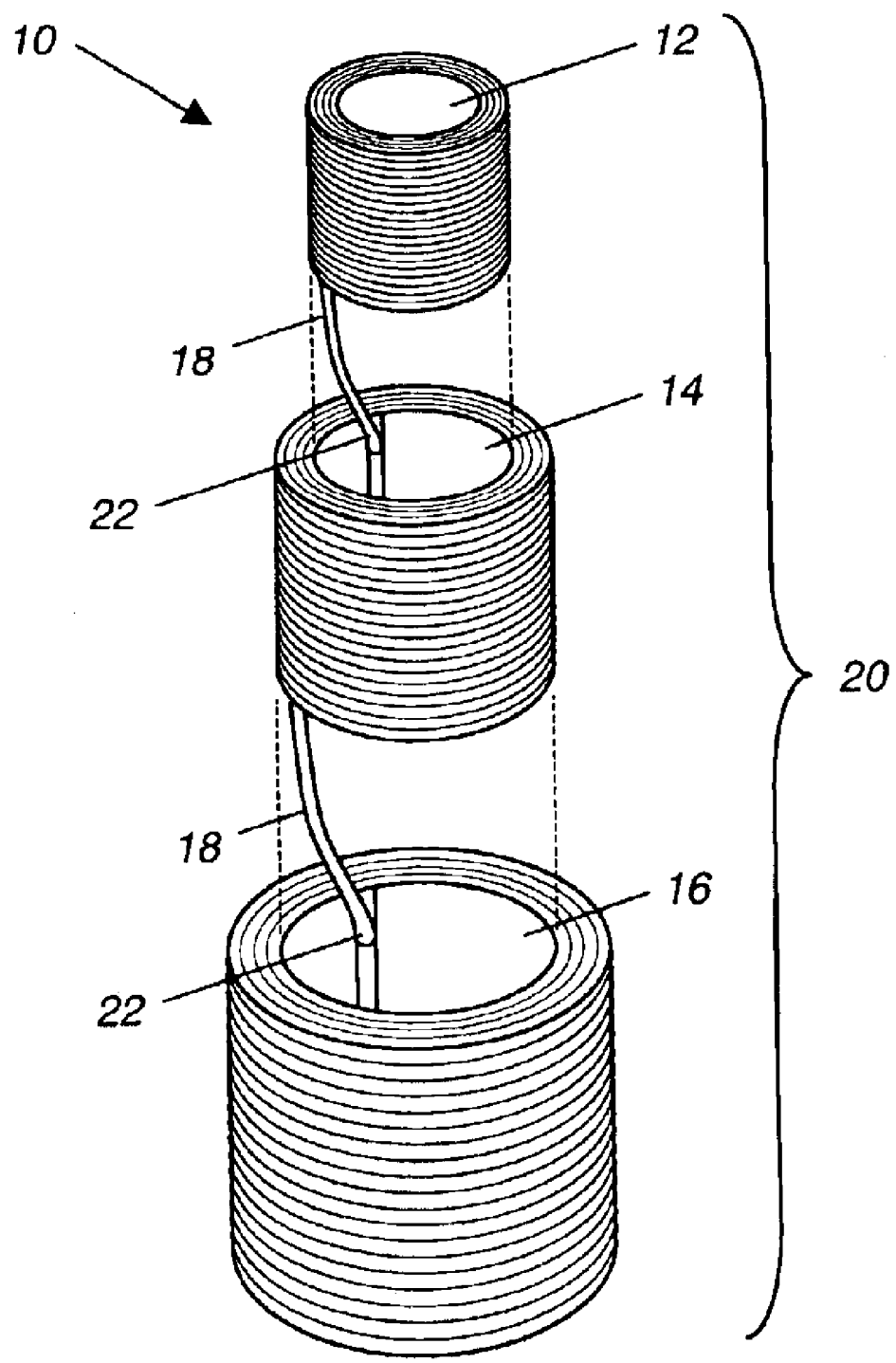
FIG. 1 is an orthogonal exploded view of nested spools in accordance with the present invention.

Referring to FIG. 1, the compact fiber packaging system of the present invention is illustrated and generally indicated as reference numeral 10. The compact fiber packaging system 10 generally comprises an inner spool 12 nested inside a first outer spool 14, which is nested inside a second outer spool 16. As shown, the outer diameter of inner spool 12 is slightly smaller than the inner diameter of first outer spool 14, and similarly, the outer diameter of first outer spool 14 is slightly smaller than the inner diameter of second outer spool 16. Accordingly, the spools may be nested inside one another for efficient volume utilization.

As shown, the fibers 18 are wrapped around the inner spool 12 and then successively around the first outer spool 14 and then the second outer spool 16 to form a module 20, wherein the outer spools 14 and 16 are nested around the inner spool 12. As further illustrated, the outer spools 14 and 16 may further comprise an aperture or slot 22 to accommodate the fibers 18 when wrapping the fibers 18 around successive outer spools. The compact fiber packaging system 10 of the present invention may comprise a plurality of spools depending on the application, and it shall be understood that the use of three spools (3) hereinafter is exemplary and shall not be construed as limiting the scope of the present invention.

Figure 2:
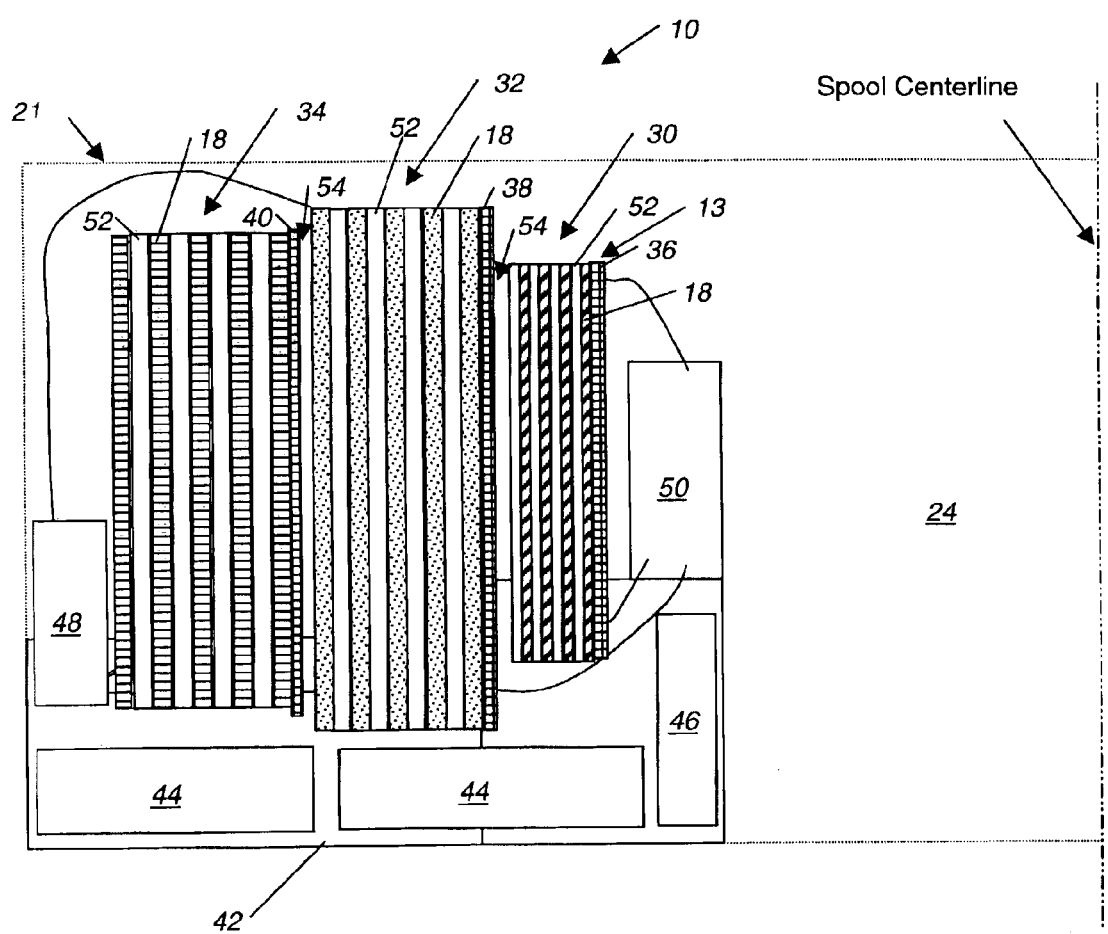
FIG. 2 is a cross-sectional view of a power staged module in accordance with the present invention.

Referring to FIG. 2, the compact fiber packaging system 10 of the present invention may comprise a series of spools having different power outputs to form a power staged module 21. The power staged module 21 is symmetric about the centerline of the spools, and therefore, only one half of the module is illustrated herein for purposes of clarity. As an illustrative example, a plurality of spools are used for three power stages, namely, low power stage 30, first high power stage 32, and second high power stage 34 as shown.

The low power stage 30 comprises, for example, 8 fibers in a ribbon (not shown). The ribbon is preferably wound in a slight helix around the inner spool mandrel 36 forming an inner-most spool 13. As shown, three (3) outer spools are additionally used for the low power stage 30. (Not all mandrels are shown for clarity). The first high power stage 32 comprises, for example, 7 fibers in a ribbon, which is similarly wound in a slight helix around the mandrel 38. As shown, a total of five (5) spools are used for the first high power stage 32. The second high power stage 34 similarly comprises five (5) spools having several fibers in a ribbon wound in a slight helix around the mandrel 40. Accordingly, approximately 14 spools are nested around one another to form the three (3) power stages, 30, 32, and 34 of the power staged module 21 as illustrated.

The three power stages described herein are for illustrative purposes and shall not be construed as limiting the invention to the particular embodiment described herein. It shall be appreciated by those skilled in the art that any number of spools and power stages may be employed according to the teachings of the present invention.

As shown, additional equipment and materials are disposed adjacent and within power staged module 21, and further within a hollow center 24 defined by the inner-most spool 13. In one form, the compact fiber packaging system 10 of the present invention comprises fiber lasers, which generate a significant amount of heat during operation that is preferably dissipated to minimize power losses. Further, the fiber lasers generally operate on a limited duty cycle, for example, a few seconds out of a minute. Accordingly, waste heat is generated and must be stored and dissipated to further minimize power losses.

As shown, a shelf 42, or a plurality thereof, may be secured to the spools to facilitate equipment and materials for heat dissipation and removal, and further for operation of the fibers 18. To dissipate the heat generated by the fibers 18, the present invention employs phase change materials 44 that are disposed adjacent the spools for temporary heat storage after the fibers 18 operate for a limited duty cycle. A relatively small and light cooling system 46 is then employed, which is sized for continuous duty, to remove the heat from the phase change materials 44. As a result, the need for a large and expensive cooling system that operates continuous duty is eliminated.

In addition to waste heat removal, thermal gradients between the fibers from one spool to the next are minimized by the present invention. In one form, the compact fiber packaging system 10 further comprises an insulating layer 52 between the fibers 18 and the corresponding spool. Additionally, an air space formed between the spools is filled with a thermally conductive potting compound 54. Moreover, the mandrels 36, 38, and 40 are a thermally conductive material to further minimize thermal gradients between the fibers 18.

In addition, the shelf 42 may further accommodate high power diodes 48 and low power diodes 50 for operation of the fibers 18. In order to further utilize the available volume, equipment may be disposed within the hollow center 24 of the innermost spool, such as the low power diodes 50 as shown. Depending on the size of the spools and the type of fibers being used, a variety of equipment commonly known in the art may be disposed within the compact fiber packaging system 10 in accordance with the teachings herein.

Figure 3:
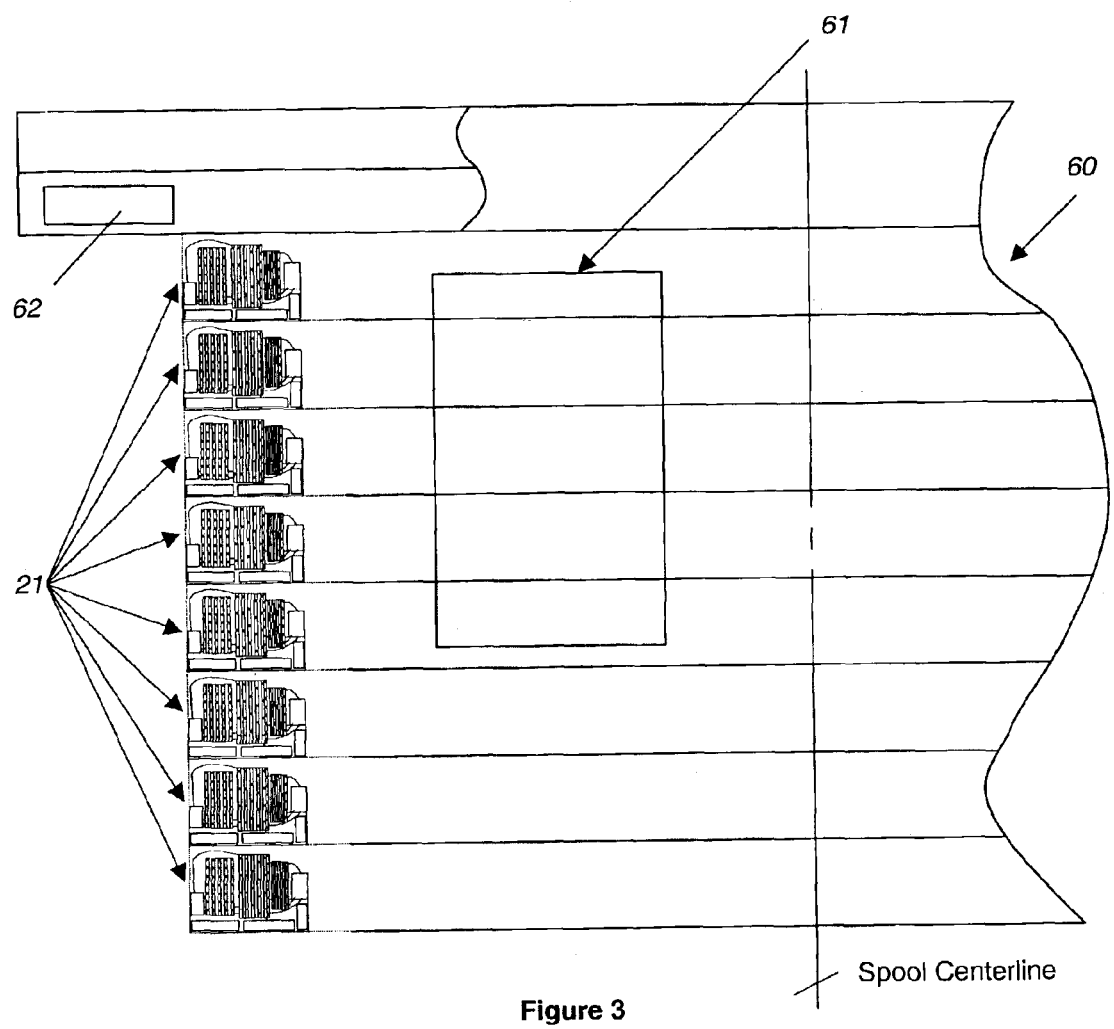
FIG. 3 is a partial cross-sectional view of fiber modules stacked to form a fiber assembly in accordance with the present invention.

Referring to FIG. 3, the power staged modules 21 may further be stacked to form a fiber assembly 60. Additionally, a common optical bench 62 may further be used to transfer the fiber laser output to a next point of usage such as a beam director. Accordingly, any number of modules 20 or power staged modules 21 may be stacked to form a fiber assembly 60 that meet the requirements of a specific application. The hollow space formed within the fiber assembly is useful for locating various support equipment 61.

Although the spools are illustrated herein as circular in shape, spools having other shapes, both convex and concave, may also be employed according to the teachings of the present invention. The shape of the spools are primarily limited by the minimum bend radius of the fibers, and thus, a variety of spool shapes and sizes may be used according to any given application.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A compact fiber packaging system comprising:
   at least one inner spool that comprises a fiber wrapped about a mandrel;
   at least one outer spool that comprises a fiber wrapped about a mandrel; and
   the mandrel of the inner spool nested inside the mandrel of the outer spool,
   wherein fibers wrapped around the inner spool are wrapped around the outer spool, thereby forming a module.

2. The compact fiber packaging system of claim 1 further comprising:
   at least one shelf mounted to at least one spool,
   wherein the shelf accommodates equipment and materials for operation of the fibers.

3. The compact fiber packaging system of claim 2, wherein the materials further comprise phase change materials that absorb waste heat from the fibers.

4. The compact fiber packaging system of claim 3, wherein the equipment further comprises a cooling system that removes the waste heat absorbed by the phase change materials.

5. The compact fiber packaging system of claim 1, wherein a plurality of modules are stacked to form a fiber assembly.

6. The compact fiber packaging system of claim 5 further comprising:
   an optical bench,
   wherein output from the fibers is transferred to a next point of usage by the optical bench.

7. The compact fiber packaging system of claim 1 further comprising:
   an insulating layer disposed between the fibers and the mandrel of the inner spool; and
   an insulating layer disposed between the fibers and the mandrel of the outer spool,
   wherein the insulating layer minimizes thermal gradients within the fibers.

8. The compact fiber packaging system of claim 1 further comprising:
   a thermally conductive patting compound disposed between the inner spool and the outer spool to minimize thermal gradients within the fibers.

9. The compact fiber packaging system of claim 1, wherein the mandrels are made of a thermally conductive material to minimize thermal gradients within the fibers.

10. A compact fiber packaging system comprising:
    at least one inner spool that comprises a fiber wrapped about a mandrel;
    at least one outer spool that comprises a fiber wrapped about a mandrel;
    the mandrel of the inner spool nested inside the mandrel of the outer spool,
    the fibers wrapped around the inner spool being wrapped around the outer spool, to thereby form a module; and
    wherein the fibers are fiber lasers.

11. The compact fiber packaging system of claim 1, wherein the inner spool defines a hollow center, and equipment and materials for operation of the fibers is disposed in the hollow center for efficient volume utilization.

12. The compact fiber packaging system of claim 1, wherein the outer spool further comprises an aperture to accommodate the fibers when the fibers are wrapped around the outer spool.

13. The compact fiber packaging system of claim 1 further comprising:
    a first outer spool; and
    a second outer spool,
    wherein the timer spool is nested inside the first outer spool and the first outer spool is nested inside the second outer spool for efficient volume utilization.

14. A compact fiber packaging system comprising:
    a low power stage; and
    at least one high power stage,
    wherein fibers are wrapped around spools in the low power stage and the high power stage, and the spools are nested inside one another to form a power staged module for efficient volume utilization.

15. The compact fiber packaging system of claim 14 further comprising:
    a first high power stage; and
    a second high power stage,
    wherein the low power stage is nested inside the first high power stage, and the first high power stage is nested inside the second high power stage.

16. The compact fiber packaging system or claim 14, wherein a plurality of power staged modules are stacked to form a fiber assembly.

17. The compact fiber packaging system of claim 16 further comprising an optical bench that transfers output from fibers in the power stages to a next point of usage.

18. A method of packaging fibers, the method comprising the steps of:
    (a) wrapping fibers around an inner mandrel to form an inner spool;
    (b) nesting the inner spool inside at least one outer mandrel; and
    (c) wrapping the fibers around the at least one outer mandrel to form an outer spool;
    wherein the fibers, the inner spool, and the outer spool form a module.

19. The method of claim 18, further comprising the steps of:
 (a) mounting at least one shelf to at least one spool; and
 (b) installing equipment and materials on the shelf,
 wherein the equipment supports operation of the fibers.

20. The method of claim 19, wherein the step of installing materials on the shelf further comprises:
 installing phase change materials that absorb waste heat from the fibers.

21. The method of claim 20, wherein the step of installing equipment on the shelf further comprises:
 installing a cooling system that removes the waste heat absorbed by the phase change materials.

22. The method of claim 18, further comprising the step of:
 stacking the modules to form a fiber assembly.

23. The method of claim 22, further comprising the steps of:
 (a) installing an optical bench; and
 (b) transferring output from the fibers to the optical bench, and from the optical bench to a next point of usage.

24. The method of claim 18, further comprising the steps of:
 (a) installing an insulating layer between the fibers and the inner mandrel of the inner spool; and
 (b) installing an insulating layer between the fibers and the outer mandrel of the outer spool,
 wherein the insulating layer minimizes thermal gradients between the fibers.

25. The method of claim 18, further comprising the step of:
 installing a thermally conductive potting compound between the inner spool and the outer spool to minimize thermal gradients within the fibers.

26. The compact fiber packaging system of claim 1 wherein at least one of the at least one inner spool and/or the at Least one outer spool comprises first and second concentric nested sets comprising at least one fiber and a respective mandrel, with the at least one fiber of the first and the second concentric nested sets wrapped about the respective mandrel of the first and the second concentric nested sets.

27. The compact fiber packaging system of claim 1 wherein:
 the at least one inner spool comprises first and second concentric nested sets comprising at least one fiber and a respective mandrel, with the at least one fiber of the first and the second concentric nested sets wrapped about the respective mandrel of the first and the second concentric nested sets; and
 the at least one outer spool comprises first and second concentric nested sets comprising at least one fiber and a respective mandrel with the at least one fiber of the first and the second concentric nested sets wrapped about the respective mandrel of the first and the second concentric nested sets.

28. The compact fiber packaging system of claim 1 wherein a plurality of modules are stacked one on top of another to form a fiber assembly, with first and second modules that comprise at least one shelf mounted to the mandrel of at least one spool of the first and the second modules, to accommodate equipment for operation of the fibers.

29. The method of claim 18, wherein the step of wrapping fibers around an inner mandrel to form an inner spool comprises forming first and second concentric nested sets comprising at least one fiber and a respective mandrel, and the method further comprises the step of wrapping the at least one fiber of the first and the second concentric nested sets about the respective mandrel of the first and the second concentric nested sets.

30. The method of claim 29, wherein the step of wrapping the at least one fiber of the first and the second concentric nested sets about the respective mandrel of the first and the second concentric nested sets comprises disposing the at least one fiber of the first and the second concentric nested sets about the outer mandrel.

31. The method of claim 18, further comprising the steps of:
 providing first and second modules;
 providing at least one shelf mounted to the mandrel of at least one spool in the first and the second modules, to accommodate equipment for operation of the fibers; and
 stacking the first and the second modules one on top of another to form a fiber assembly.

* * * * *